United States Patent
Lee et al.

(10) Patent No.: US 9,164,198 B2
(45) Date of Patent: Oct. 20, 2015

(54) FILMS HAVING SWITCHABLE REFLECTIVITY

(71) Applicant: KOREA UNIVERSITY RESEARCH AND BUSINESS FOUNDATION, Seoul (KR)

(72) Inventors: Kwangyeol Lee, Namyangju-si (KR); Donghoon Choi, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 14/260,088

(22) Filed: Apr. 23, 2014

(65) Prior Publication Data

US 2014/0231386 A1   Aug. 21, 2014

Related U.S. Application Data

(62) Division of application No. 12/762,183, filed on Apr. 16, 2010, now Pat. No. 8,741,417.

(51) Int. Cl.
| | |
|---|---|
| *B29D 11/00* | (2006.01) |
| *B44C 1/22* | (2006.01) |
| *G02B 1/10* | (2015.01) |
| *B82Y 20/00* | (2011.01) |
| *G02B 1/118* | (2015.01) |
| *G02B 26/00* | (2006.01) |
| *G02B 1/11* | (2015.01) |

(52) U.S. Cl.
CPC . *G02B 1/10* (2013.01); *B82Y 20/00* (2013.01); *G02B 1/11* (2013.01); *G02B 1/118* (2013.01); *G02B 26/004* (2013.01); *G02B 2207/101* (2013.01); *Y10T 428/2462* (2015.01); *Y10T 428/24355* (2015.01); *Y10T 428/24479* (2015.01); *Y10T 428/24504* (2015.01)

(58) Field of Classification Search
USPC .......................................... 216/11, 24, 41, 67
See application file for complete search history.

(56) References Cited

U.S. PATENT DOCUMENTS

| | | |
|---|---|---|
| 5,472,812 A | 12/1995 | Sekine |
| 6,071,501 A | 6/2000 | Robinson |
| 2007/0077396 A1 | 4/2007 | Aizenberg et al. |
| 2007/0084635 A1* | 4/2007 | Burrows et al. .................. 175/26 |

(Continued)

FOREIGN PATENT DOCUMENTS

WO   WO 2009/061349   10/2008

OTHER PUBLICATIONS

H. Kaczmarek, et al "Study of Poly(acrylic acid)-poly(vinylpyrolidone) complexes and their photostability" Polymer 42 (2001) 6057-6069.

(Continued)

*Primary Examiner* — Shamim Ahmed
(74) *Attorney, Agent, or Firm* — Dorsey & Whitney LLP (57) ABSTRACT

Compositions, structures and methods that relate to films having switchable reflectivity and anti-reflectivity depending on ambient conditions, such as temperature. A film with switchable reflectivity and anti-reflectivity includes a nanostructured first layer having nanopillars associated with nanowells. A hydrogel occupies at least a portion of the nanowells. As the hydrogel moves from a dehydrated state to a hydrated state, the surface of the film switches from being reflective to being anti-reflective in a repeatable and reversible process.

21 Claims, 3 Drawing Sheets

(56) References Cited

U.S. PATENT DOCUMENTS

| | | | |
|---|---|---|---|
| 2007/0166862 A1* | 7/2007 | Kim et al. | 438/42 |
| 2007/0237937 A1 | 10/2007 | Aizenberg et al. | |
| 2008/0072357 A1 | 3/2008 | Aizenberg et al. | |
| 2008/0084635 A1* | 4/2008 | Lee et al. | 360/135 |
| 2008/0095977 A1 | 4/2008 | Aizenberg et al. | |
| 2008/0241262 A1* | 10/2008 | Lee et al. | 424/490 |
| 2010/0080954 A1* | 4/2010 | Mohseni | 428/131 |
| 2010/0298760 A1 | 11/2010 | Olle et al. | |
| 2011/0256349 A1 | 10/2011 | Lee et al. | |

OTHER PUBLICATIONS

Yi-Fan Huang, et al "Improved broadband and quasi-omnidirectional anti-reflection properties with biomimetic silicon nanostructures" Nature Nanotechnology 2, 770-774 (Dec. 1, 2007) | doi:10.1038/nnano.2007.389.

Guoyong Xie, et al "The Fabrication of Subwavelength Anti-reflective nanostructures Using a Bio-template," Nanotechnology 19 (2008) 095605 (5PP).

James Tyrrell "Nature offers up photonic nanostructure" nanotechweb.org, Mar. 4, 2008 [Online: http://nanotechweb.org/cws/article/tech/33181].

Tom Simonite "Cicada wings become nano-stamps" newscientist.org Nov. 3, 2006 [Online: http://www.newscientist.com/article/dn10444-cicada-wings-become-nanostamps].

Richter, A. et al. "Review on Hydrogel-based pH Sensors and Microsensors" Sensors, 2008, vol. 8, pp. 561-581.

International Search Report and Written Opinion from International Application No. PCT/KR2011/001311 dated May 9, 2011.

U.S. Appl. No. 12/762,183, Jul. 30, 2012, Office Action.

U.S. Appl. No. 12/762,183, Jan. 4, 2013, Office Action.

U.S. Appl. No. 12/762,183, Jan. 28, 2014, Notice of Allowance.

* cited by examiner

FILMS HAVING SWITCHABLE REFLECTIVITY

CROSS-REFERENCE TO RELATED APPLICATIONS

This application is a division under 35 U.S.C. §121 of U.S. patent application Ser. No. 12/762,183 filed on 16 Apr. 2010, now U.S. Pat. No. 8,741,417, the disclosure of which is incorporated herein, in its entirety, by this reference.

BACKGROUND

Reflectivity is the fraction of incident radiation reflected by a surface. The reflectivity or anti-reflectivity of a coating typically depends on several different factors such as the type of material used, the index of refraction of the thin film materials, the thickness of the film, the number of layers and the differences in the materials used between multiple layers, and/or the micro morphology of the surface of the film.

Reflective films are used extensively on glass and other substrates where it is desirable to control the amount of light that passes through a substrate and/or impinges on the substrate. For example, windows on buildings are often coated with a thin film to reduce the amount of light that enters the building. Controlling the light transmission can improve the apparent quality of an image viewed through the window and can reduce the amount of heat produced from sunlight exposure, thereby reducing air conditioning demand in buildings.

Anti-reflective films are films that reduce the amount of light reflected off a surface and tend to cause light to be coupled into or through a substrate. Anti-reflective coatings have the generally opposite effect on light transmission as compared with reflective films.

SUMMARY

The compositions, structures and methods disclosed herein relate to films having switchable reflectivity and anti-reflectivity depending on temperature. According to one embodiment, a film with the switchable reflectivity and anti-reflectivity includes a nanostructured first layer having a nanopillars associated with nanowells. A hydrogel is positioned within at least a portion of the nanowells. Embodiments also extend to substrates that support the film and structures that include such substrates.

According to an embodiment, a method for making a film includes providing a nanostructured first layer having nanopillars that define nanowells. The nanowells are at least partially filled with a hydrogel.

Another embodiment relates to a method for using a film having switchable reflectivity and anti-reflectivity depending on temperature. The method of this embodiment includes providing a film that includes a nanostructured first layer having nanopillars that define nanowells and a hydrogel within at least a portion of the nanowells. The film is exposed to a first temperature that causes the hydrogel to provide a reflective surface. The film is exposed to a second temperature that causes the hydrogel to form an anti-reflective surface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated, and designed in a wide variety of different configurations, all of which are explicitly contemplated herein.

The compositions, structures and methods disclosed herein relate to films having switchable reflectivity and anti-reflectivity depending on temperature. Such temperature sensitive films can include a nanostructured first layer that has nanopillars that at least partially define nanowells, which are the spaces bounded by the nanowells. A hydrogel is at least partially positioned within the nanowells, thereby at least partially filling the spaces between the nanopillars.

The hydrogel can absorb and release water, thereby changing the size and surface topography of the hydrogel. The hydrogel can change from a first configuration in which the film forms a reflective surface to a second configuration in which the film becomes anti-reflective and vice versa. The spacing, shape, and/or configuration of the nanopillars influences the spacing, shape, and/or configuration of the hydrogel as the hydrogel changes between the first configuration and the second configuration, thereby achieving the switchable reflective and anti-reflective characteristics of the film. In general, closer spaced nanopillars result in narrower hydrogel features. Taller nanopillars relative to the hydrogel generally result in more water being absorbed for switching of reflectivity to occur.

In one embodiment, the hydrogel imparts reflectivity in the first configuration by having a substantially flat surface near an upper level of the nanopillars of the nanostructured first layer. In the second configuration, the hydrogel loses its substantially flat surface to form a broken, uneven, and/or varied surface topography with nanosized features that promote anti-reflectivity. For example, the hydrogel in the second configuration can form nanostructured hydrogel pillars above the upper level of the nanopillars of the nanostructured first layer. The nanostructures of the hydrogel in the second configuration promote anti-reflectivity.

The films having switchable reflectivity and anti-reflectivity can be applied to substantially any substrate for which it is desirable to facilitate or inhibit light transmission, depending on an external stimulus, such as, but not limited to, temperature. The films can be adhered to a substrate using an adhesive, by electrostatic interaction, and/or other methods used in the art for applying a thin film to a substrate. In one embodiment, the hydrogel can be configured to more readily absorb water at a particular temperature. For example, in one embodiment, the hydrogel can have a temperature-induced absorption or desorption of water in a range from about 15° C. to about 30° C., alternatively in a range from about 20° C. to about 25° C. Hydrogels having a temperature-induced absorption allows the polymer to retain water, or alternatively repel water, even when the humidity changes substantially (e.g., due to weather).

In one embodiment, the film is applied to a translucent or transparent substrate, such as but not limited to, translucent glasses, ceramics, polymers, and/or crystalline materials. Specific examples include silica, indium tin oxide, polycarbonates, polyacrylates, soda glass, sapphire, aluminum oxynitride, and the like. The substrate may be used in isolation, or as part of other structures, either permanently or transiently. For example, the film can be applied to a window or translucent surface of a building or other structure, such as but not limited to, greenhouses, atriums, pavilion, patio coverings, tent, and the like . . . or vehicles, such as but not limited to, cars trucks, boats and the like. The switchable film can provide reflectivity when the ambient temperature is relatively warm, thereby reducing the amount of light that enters the building, vehicle, or other structure, for example. When the ambient temperature cools, the hydrogel can absorb water and provide anti-reflectivity. The anti-reflectivity couples the light into the structure, thereby increasing warmth in, for example, the building or vehicle that has the window. The switchable films allow the light transmission to vary depending on an ambient condition. This feature is in contrast to films that have a static morphology, which generally provide reflectivity or anti-reflectivity, but not both.

The embodiments described herein include methods for using the reflectivity and anti-reflectivity switchable films. In one embodiment, the method includes providing a film having nanopillars associated with nanowells and a hydrogel disposed within the nanowells. The method of this embodiment includes exposing the film to a first temperature in which the hydrogel is in a first configuration and then exposing the film to a second temperature to cause the hydrogel to be in a second configuration, thereby changing the transmission of light through the film in the first configuration compared with the second configuration.

As used herein, the terms "reflective" and "anti-reflective" and permutations or derivatives thereof are relative and relate to the reflectivity of a structure (e.g., a surface, film, etc.) as the structure moves between configurations. For example, a surface is "reflective" in a first configuration and "anti-reflective" in a second configuration if the reflectivity of the surface is greater in the first configuration than in the second configuration. In general, the structure can properly be designated as "reflective" and "anti-reflective" regardless of the absolute values of the reflectivity in the first and second configurations as long as the reflectivity changes between the configurations. The values of the reflectivity in the first and second configurations often depend, for example, on the desired application or use of the structure or on the materials selected to form the structure.

As used herein, the terms "hydrated" and "dehydrated" and permutations or derivatives thereof are relative and relate to the amount of water contained or associated with a material (e.g., a hydrogel) as the material moves between configurations. For example, a material is "dehydrated" in a first configuration and "hydrated" in a second configuration if the amount of water contained or associated with the material is greater in the second configuration than in the first configuration. In general, the material can properly be designated as "hydrated" and "dehydrated" regardless of the absolute values of the hydration in the first and second configurations as long as the hydration changes between the configurations. The values of the hydration in the first and second configurations often depend, for example, on the desired application or use of the material.

I. Films Having Switchable Reflectivity and Anti-Reflectivity

Figure 1:
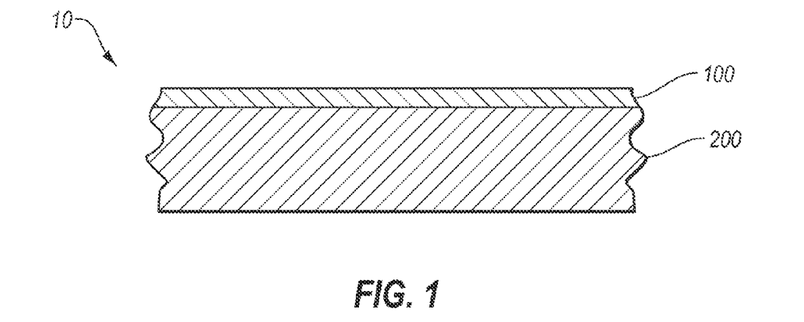
FIG. 1 shows a cross sectional view of an illustrative embodiment of a thin film on a substrate.

FIG. 1 illustrates a structure 10 that includes a thin film 100 and a substrate 200. The thin film 100 can change between a first configuration and a second configuration to cause switching between a reflective surface and an anti-reflective surface. In many embodiments, the transition from the first configuration to the second configuration and thus between reflectivity and anti-reflectivity, is reversible and repeatable. The thin film 100 can be made from one or more organic or inorganic materials, such as, but not limited to glass, $SiO_2$, $TiO_2$, polymeric materials, etc., and can have any thickness suitable for providing a nanostructured material. In one embodiment, the film has a thickness in a range from about 100 nm to about 50 mm, alternatively about 200 nm to about 5 mm. Substrate 200 can be substantially any substrate for which it is desirable to change the reflectivity. Examples of the materials suitable for use in the substrate 200 include, but are not limited to, translucent glasses, ceramics, polymers, and/or crystalline materials. Specific examples include silica, indium tin oxide, polycarbonates, polyacrylates, soda glass, sapphire, aluminum oxynitride, and the like. In some embodiments, the substrate 200 is an existing material, such as but not limited to, architectural or window glass, plastic sheets, including polycarbonates and methacrylates, tarpaulins, tents, greenhouses, sky lights, and the like, to which the thin film 100 is applied.

Figure 2:
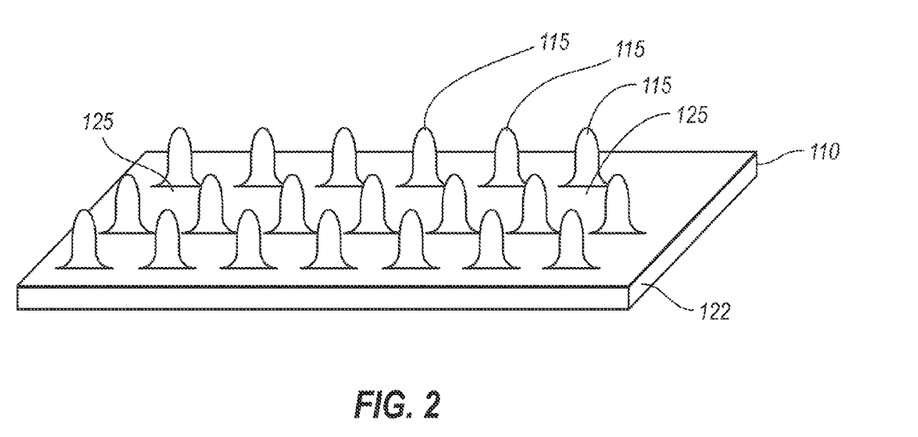
FIG. 2 shows a perspective view of a nanostructured first layer of the illustrative thin film of FIG. 1.

FIG. 2 shows a perspective view of a nanostructured first layer 110 of the thin film 100 of FIG. 1. The nanostructured first layer 110 includes a plurality of nanopillars 115, each extending generally upward from a base 122. The nanostructured first layer 110 can include substantially any number of the nanopillars 115. Because the nanopillars 115 are nanostructures, a film of usable size typically has thousands or even millions of nanopillars. The nanopillars 115 can be monolithic with the base 122 or can be discrete structures that are attached to the base 122.

The nanostructured first layer 110 can be made from any material into which the nanopillars 115 can be formed or placed. The nanostructured first layer 110 is typically a translucent inorganic or polymeric material. Examples of suitable inorganic materials include, but are not limited to, silicates, metal oxides, titanates, nitrates, carbonates, borates, chalcogenides, fluorides, semiconductors and oxides of semiconductors, such as, but not limited to, germanates, tellurites, antimonates, arsenates, combinations of these, and the like. Examples of a suitable polymeric material include, but are not limited to, polyacrylates and polycarbonates.

Figure 3:
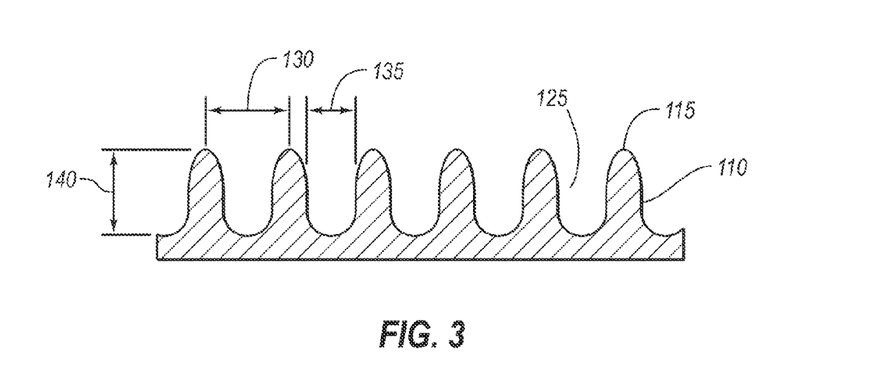
FIG. 3 shows a cross sectional view of the nanostructured first layer of the illustrative thin film of FIG. 1.

The nanopillars 115 are spaced apart so as to provide nanowells 125. Nanowells 125 are defined by the spaces between nanopillars 115. The size and shape of the nanowells 125 is typically a factor of the size, shape, and configuration of the nanopillars 115. The size, spacing, and configuration of the nanopillars 115 is selected to influence the shape of the hydrogel as discussed in greater detail hereinbelow. FIG. 3 shows a cross sectional view of the nanostructured first layer 110 of the illustrative thin film 100 of FIG. 1. As shown in FIG. 3, the nanopillars 115 can have a pitch 130, which defines the spacing between corresponding features of adjacent nanopillars 115, in a range from about 50 nm to about 1000 nm, alternatively 100 nm to about 400 nm or about 150 nm to about 300 nm, or about 175 nm to about 250 nm. In addition, the spacing 135 of the nanowells 125 can be within the foregoing ranges. The height 140 of the nanopillars 115 can be in a range from about 50 nm to 5 microns, alternatively about 100 nm to about 1000 nm or about 125 nm to about 500 nm or about 150 nm to about 300 nm. While the shape of the nanopillars 115 has been shown as cylindrical, the films disclosed herein are not limited to nanopillars 115 with an essentially cylindrical shape For example, nanopillars 115 can have faceted sidewalls and displaying any regular or irregular shaped polygonal cross-section, including but not limited to triangular, rectangular, pentagonal, hexagonal, etc. In addition, the nanopillars may vary in thickness with height. In one embodiment, the nanopillars 115 have a diameter that is less than the height 140. The nanopillars 115 can have any of the foregoing dimensions so long as the nanopillars 115 can provide associated nanowells 125 that allow hydrogel to expand from a first configuration to a second configuration.

Figure 4:
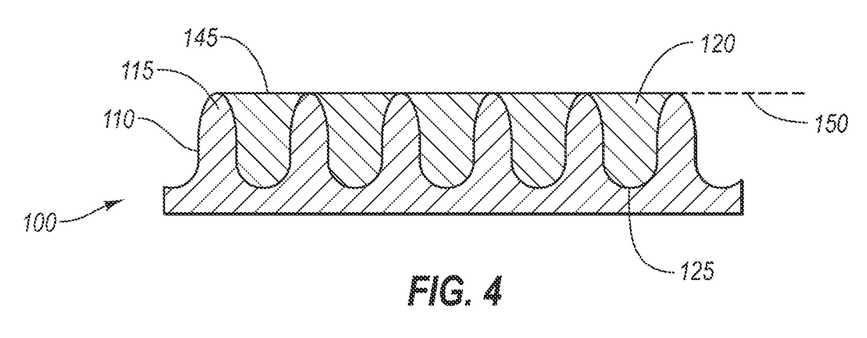
FIG. 4 shows a cross sectional view of the illustrative thin film of FIG. 1 in a first configuration.

FIG. 4 shows a cross sectional view of the illustrative thin film 100 of FIG. 1 in a first configuration. As illustrated in the embodiment of FIG. 4, a hydrogel 120 is present within the nanowells 125. The hydrogel 120 can be substantially any material that can absorb water and change in volume due to the absorption of the water and with optical properties that make it suitable for providing the reflective and anti-reflective surfaces disclosed herein. In one embodiment, the hydrogel 120 can absorb water to increase in size by at least about 20 vol %, at least about 30 vol %, at least about 50 vol %, at least about 75 vol % or at least about 90 vol %, or at least about 100 vol % or greater.

In certain embodiments, the hydrogel 120 is a water-insoluble polymeric material that can form a colloidal gel in which water is the dispersion medium. Examples of materials that can be included in the hydrogels 120 include, but are not limited to polyvinyl alcohol and/or other polymers, copolymers, and/or block copolymers having hydrophilic groups such as, but not limited to hydroxyl or carboxyl or other functional group that can hydrogen bond with water. When the switchable films described herein are used for windows in building or automobiles or in other structures or vehicles that are exposed to sunlight, a hydrogel that has relatively high photostability can promote durability and repeatability of the reflectivity switching. In one embodiment, the polymer may be free of moieties with double bonds, which tend to be unstable in strong UV light. To achieve a photostable polymer the polymer can include a UV adsorbent material such as, but not limited to titanium dioxide particles or UV absorbing organic molecules such as tocopherol. Where a UV adsorbing material is included, it may be advantageous to coat the adsorbent with an inert protective coating to prevent interaction with the polymer molecules. For example, titanium dioxide or other particles may be coated with silica. However in some embodiments where UV adsorbents and/or UV protective layers may be applied, the polymer may include hydrogels with double bonds. In one embodiment, the polymer may be polyacrylates such as, but not limited to, sodium polyacrylate and poly(2-hydroxyethyl methacrylate).

In one embodiment, the hydrogel 120 is thermally sensitive. Thermally sensitive hydrogels have a water absorption capacity that is dependent on temperature (i.e., the onset of water loss is substantially non-linear in a particular temperature range). The polymer can be negative temperature-sensitive where the polymer expands below an upper critical solution temperature or the polymer can be positive temperature sensitive such that the hydrogel contracts upon cooling below the upper critical temperature. An example of a suitable thermally sensitive hydrogel that exhibits negative temperature sensitivity includes, but is not limited to poly(N-isopropylacrylamide). Examples of positive temperature-sensitive hydrogels include but are not limited to polyacrylic acid, polyacrylamide, poly(acrylamide-co-butyl methacrylate). Examples of other thermoreversible gels include poly(ethylene oxide)-b-poly(propylene oxide)-b-poly(ethylene oxide) and natural polymers such as, but not limited to xyloglucan. In one embodiment, the thermally sensitive hydrogel has an onset of water loss that is in a range from about 15° C. to about 30° C., alternatively in a range from about 20° C. to about 25° C. The temperature at which the surface switches from reflective to anti-reflective can be partially controlled by selecting a hydrogel 120 that has an absorption onset temperature near the temperature range where a change in reflectivity is desired.

Figure 5:
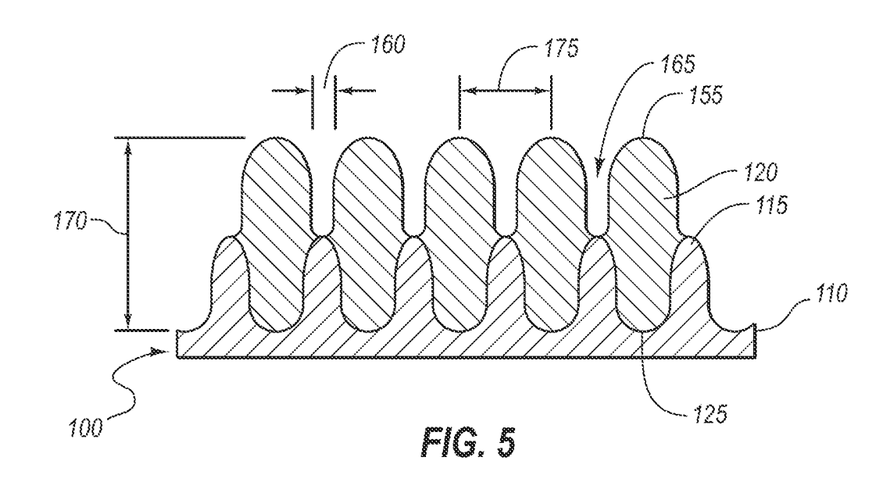
FIG. 5 shows a cross sectional view of the illustrative thin film of FIG. 1 in a second configuration.

The hydrogel 120 can include a reflective material mixed therewith. For example, the hydrogel 120 can include metals such as, but not limited to, aluminum, silver, gold, or a combination thereof to increase the reflectivity of the hydrogel 120. Other reflective materials that can be added to the hydrogel 120 to increase reflectivity will be understood by those of skill in the art upon learning of the embodiments disclosed herein FIGS. 4 and 5 illustrate the hydrogel 120 changing from a first configuration to a second configuration. In the first configuration (FIG. 4), the hydrogel 120 is in a dehydrated state, or a state of relative dehydration with respect to the second configuration that is described in more detail below, and forms a substantially flat upper surface 145. The flat upper surface 145 of the first configuration provides reflectivity relative to the anti-reflectivity of the second configuration. In one embodiment, the flat upper surface 145 is positioned near an upper level 150 of the nanopillars 115 of the nanostructured first layer 110. The nanopillars 115 do not provide anti-reflectivity in this first configuration because the upper surface 145 of the hydrogel 120 is substantially flat and approximately at the upper level 150 of the nanopillars 115.

FIG. 5 shows a cross sectional view of the thin film 100 of FIG. 1 in the second configuration. As illustrated in the embodiment of FIG. 5, the hydrogel 120 is in a hydrated state, or a state of relative hydration with respect to the first configuration. In the first configuration, the hydrogel 120 has a substantially increased volume from the absorption of water caused by, for example, a lower ambient temperature (e.g., lower temperature and/or increased water absorption as compared to the first configuration). In this embodiment, the absorption of the water causes the hydrogel 120 to swell and increase in size. In the second configuration, the nanopillars 115 and/or the nanowells 125 in the nanostructured first layer 110 cause the hydrogel 120 to form hydrogel nanopillars 155. The hydrogel nanopillars 155 are present during the hydrated state of hydrogel 120 and give the thin film 100 an anti-reflective surface. In one embodiment, the change in shape from the first configuration to the second configuration causes a decrease in reflectivity of at least about 10%, or at least about 25%, alternatively at least about 50% or at least about 75% or even greater than about 99%.

The hydrogel nanopillars 155 can have a size and configuration that makes the surface of the thin film 100 anti-reflective. For example, the peaks of the hydrogel nanopillars 155 can have a pitch 175 in a range from about 50 nm to about 1000 nm, alternatively 100 nm to about 400 nm or about 150 nm to about 300 nm or about 175 nm to about 250 nm. The spacing 160 between adjacent hydrogel nanopillars 155 creates hydrogel nanowells 165. The spacing 160 between adjacent hydrogel nanopillars 155 can be within the foregoing ranges. The height 170 of the hydrogel nanopillars 155 can be in a range from about 50 nm to 5 microns, alternatively about 100 nm to about 1000 nm, 125 nm to about 500 nm or 150 nm to about 300 nm.

In the second configuration, the hydrogel nanopillars 155 can form a hexagonal pattern of bumps. In illustrative embodiments, the bumps may each be roughly at least about 50 nm high, or about 100 nm high or about 200 nm, or even at least about 250 nm high, or in a range from about 50 nm to about 300 nm, or about 100 nm to about 250 nm and spaced apart at a distance less than about 350 nm on center, or less than about 300 nm on center, or even less than about 250 nm on center. This configuration of the hydrogel 120 forms an anti-reflective surface because the hydrogel nanopillars 155 are smaller than the wavelength of visible light, so the light interacts with the surface as if the surface had a continuous refractive index gradient between the air and the thin film 100, which decreases reflection by effectively removing the air-lens interface. Thus, even when the hydrogel 120 is formed from a highly reflective material (e.g., includes gold) the hydrogel surface 120 in the second configuration can be anti-reflective.

In some embodiments, another layer can be placed over the hydrogel 120. This other layer is typically sufficiently flexible that it can deform to achieve a similar (e.g., anti-reflective) surface as illustrated in FIG. 5. This flexible layer is typically water permeable to allow the hydrogel 120 to absorb and give off water. If desired, the flexible layer can include UV protective materials to prevent degradation of the hydrogel 120. Any of a variety of suitable thin, flexible, water vapor permeable, polymeric materials can be used, such as but not limited to, polysiloxanes, polyamides such as, but not limited to polyacrylamide, and polyacrylates, such as but not limited to poly methylmethacrylate.

The thin film 100 can be provided on the substrate 200 or used without a substrate. However, in some embodiments, applying the thin film 100 to substrate 200 can be advantageous for providing structural support and coupling light transmission between the film and the substrate.

II. Methods for Manufacturing and Using Films

Figure 6:
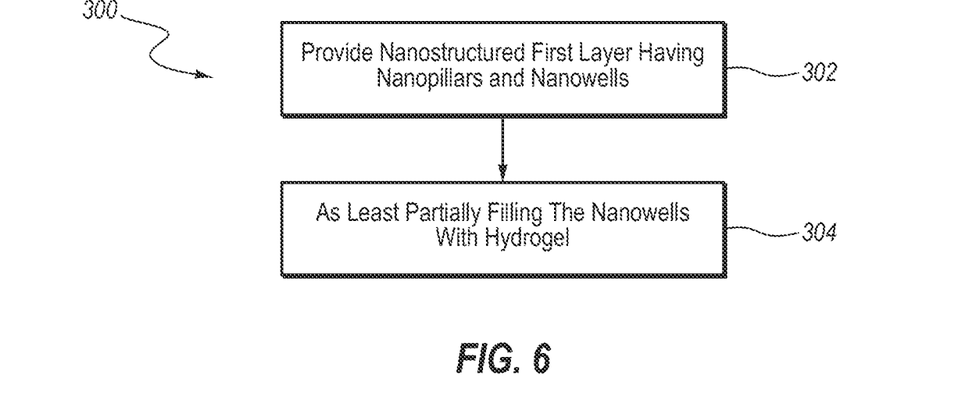
FIG. 6 is a flow diagram showing an illustrative embodiment of a method for making a thin film on a substrate.

Embodiments described herein extend to methods for making thin films that have switchable reflectivity. FIG. 6 is a flow diagram showing an illustrative embodiment of a method 300 for making a thin film on a substrate. In block 302, a nanostructured first layer having a plurality of nanopillars that at least partially define a plurality of nanowells is provided. In block 304, the nanowells are at least partially filled with a hydrogel to form a switchable film. The switchable films described herein can be manufactured by forming a nanostructured first layer and then filling the nanostructured first layer with a hydrogel to a level that provides a substantially flat or reflective surface at a desired temperature in a process that can be described by making reference to FIG. 4.

The nanostructured first layer 110 can be manufactured using any process suitable for forming the nanopillars 115 and the nanowells 125 in a material. Examples of suitable techniques for forming the nanostructured first layer 110 include etching, nanoimprinting, plasma etching, deposition and the like.

In one embodiment, the nanostructured first layer 110 can be manufactured using lithographic techniques and etching. In this embodiment, nanofeatures are formed in a material by etching away or otherwise removing a portion of the material to yield the nanostructured first layer 110. The pattern for removing the portion of the material is provided using lithography. A mask is formed on the surface of the material to be etched and then a portion of the mask is removed to expose the pattern to be etched. The particular etchant will depend on the material being etched. In one embodiment, the etchant is an acid or a base used to etch an inorganic oxide material. Those skilled in the art will be familiar with lithographic techniques and etching.

In one embodiment, the nanostructured first layer 110 can be manufactured using a molding technique in which a mold having the negative impression of the desired nanopillars 115 and nanowells 125 is formed in the mold. The nanostructured first layer 110 can then be formed by casting the first layer material in the mold. Those skilled in the art are familiar with molding techniques for manufacturing structures such as nanopillars. In one embodiment, a naturally existing nanostructured material is used as a template for making a mold. For example, a mold can be manufactured from the wings of cicada insects, which have naturally occurring anti-reflective nanostructures. The mold can then be used to manufacture a nanostructured first layer having the features of the naturally occurring nanostructures on the cicada's wings. An example of a method for manufacturing a material having nanostructures similar to those of the wings of a cicada is disclosed in an article by Xie entitled "The Fabrication of Subwavelength Anti-reflective nanostructures Using a Bio-template," published in Nanotechnology 19 (2008), which is hereby incorporated herein by reference.

In an alternative embodiment, the nanostructured first layer 110 can be formed using a sol-gel technique. In this embodiment, the material for the nanostructured first layer 110 is deposited from a chemical solution. The configuration of the nanowells 125 can be provided by templating nanostructures (e.g. carbon nanostructures) dispersed in the sol-gel. After the formation of the nanostructured first layer 110, the templating nanostructures can be selectively removed (e.g., by chemical etching).

The hydrogel 120 can be deposited in the nanowells 125 by polymerizing a liquid monomer on a substrate having a plurality of nanopillars 115 and then polymerizing the monomer to form the hydrogel polymer. The depth of the hydrogel can be selected to submerse the nanopillars 115 or extend to the upper level 150. In one embodiment, the hydrogel 120 in the first configuration imparts reflectivity through a surface that submerses at least about 90% of the surface area of the nanopillars 115 of the nanostructured first layer 110, alternatively about 100% of the nanopillars 115 of the nanostructured first layer 110 are submersed. In one embodiment, the height of the hydrogel 120 above the upper level 150 is sufficient in the second configuration shown in FIG. 5 such that the hydrogel 120 forms discrete peaks that impart anti-reflectivity. In one embodiment, the height of the hydrogel 120 above the top of the nanopillars is at least about 10 nm, or at least about 20 nm, or at least about 50 nm or at least about 100 nm or at least about 200 nm. Alternatively, the height of the hydrogel 120 above the tops of nanopillars 115 in the second configuration can be in a range from about 5 nm to 200 nm, alternatively about 10 nm to about 100 nm, or about 15 nm to about 50 nm.

The nanostructured first layer 110 shown in FIG. 4 can be formed directly on a substrate or can be formed in a thin film material that can then be applied to a substrate. For example, in one embodiment, the nanostructured first layer 110 can be formed on the surface of a vitreous material by etching the nanostructure in the surface of the vitreous substrate.

In an alternative embodiment, the nanostructured first layer 110 can be very thin. In one embodiment the thickness can be less than about 5 mm, less than about 2 mm, or less than about 1 mm. In this embodiment, the thin film 100 can be separate and discrete from the substrate and then adhered to, bonded to, or otherwise associated with a substrate. Forming the thin film 100 separate from a substrate can be advantageous where the substrate cannot be easily manipulated (e.g., an existing window on a tall building). In some embodiments, forming the nanostructured first layer 110 directly on a substrate can be advantageous to avoid applying the film to the substrate as described above.

Figure 7:
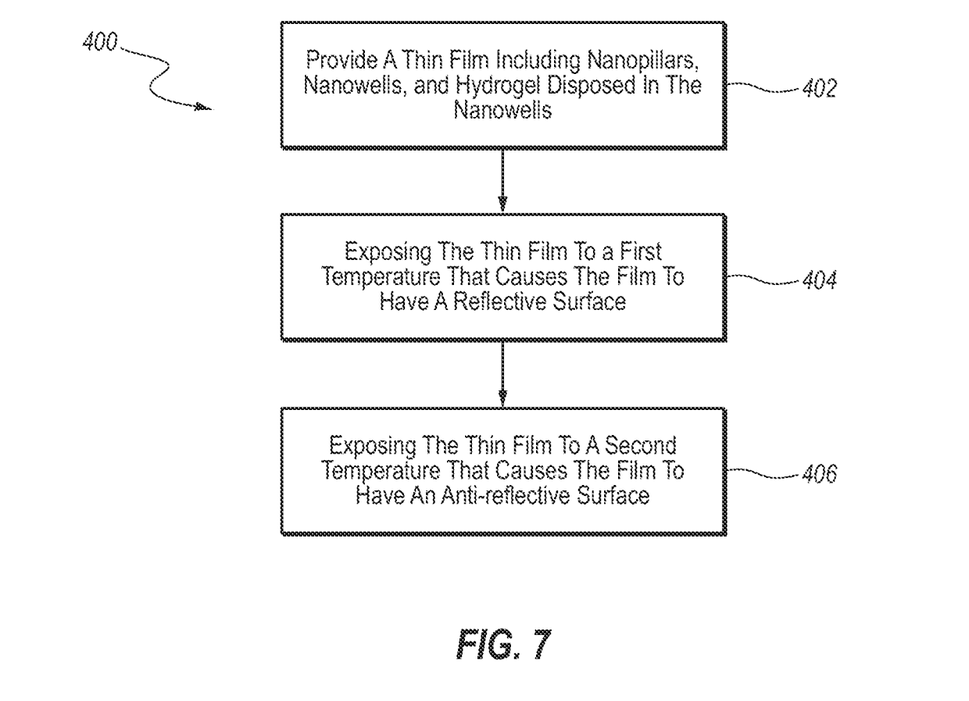
FIG. 7 is a flow diagram showing an illustrative embodiment of a method for using a thin film on a substrate.

The embodiments described herein also extend to methods for using the reflectivity and anti-reflectivity switchable films. In one embodiment, the method can be described with reference to FIGS. 4 and 7. FIG. 7 is a flow diagram showing an illustrative embodiment of a method 400 for using a thin film on a substrate. In block 402, a thin film is provided, including a plurality of nanopillars 115 associated with a plurality of nanowells 125 and hydrogel 120 positioned in the nanowells 125. In block 404, the thin film 100 is exposed to a first temperature that causes the thin film 100 to have a reflective surface in which the hydrogel 120 is in a first configuration. In block 406, the thin film 100 is exposed to a second temperature that causes the thin film 100 to have an anti-reflective surface in which the hydrogel 120 is in a second configuration. Blocks 404 and 406 are repeatable and reversible, and the transmission of light through the thin film 100 changes in reflectivity from the first configuration compared to the second configuration. In one embodiment, the first configuration is provided at a temperature in a range from about 0° C. to about 25° C., or between about 5° C. and about 20° C. and the second configuration having anti-reflectivity is achieved in a temperature range between about 15° C. and about 40° C., alternatively in a range from about 20° C. to about 35° C.

The switchable films described herein can be used on substantially any substrate where it is desirable to switch between reflective and anti-reflective properties depending on the ambient temperature. Various embodiments of the switchable films can be used on cars, buildings, or any surface that is exposed to water vapor and/or changes in temperature.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for making a film, the method comprising:
providing a nanostructured first layer having a plurality of nanopillars defining a plurality of nanowells;
at least partially filling the plurality of nanowells with a hydrogel;
selecting a volume of the plurality of nanowells and the hydrogel to cooperatively cause the hydrogel to switch between an anti-reflective state and a reflective state in response to a temperature change;
wherein:
in the anti-reflective state, the hydrogel extends beyond the plurality of nanopillars to provide a substantially non-planar anti-reflective surface; and
in the reflective state, the plurality of nanowells are substantially filled with the hydrogel to a sufficient level to form a substantially flat reflective surface.

2. The method of claim 1, wherein providing a nanostructured first layer having a plurality of nanopillars defining a plurality of nanowells further includes forming the nanostructured first layer using etching, nanoimprinting, plasma etching, deposition, molding, or combinations thereof.

3. The method of claim 2, wherein forming the nanostructured first layer includes making a mold having a negative impression of a plurality of nanopillars and casting the mold with a first layer material.

4. The method of claim 2, wherein forming the nanostructured first layer includes making a mold having a negative impression of a plurality of nanopillars from a template of a naturally existing nanostructured material and casting the mold with a first layer material.

5. The method of claim 2, wherein forming the nanostructured first layer includes masking a surface of a first layer material, removing at least a single portion of the mask, and exposing at least a single unmasked portion of the first layer material to an etchant sufficient to yield the nanostructured first layer.

6. The method of claim 5, wherein the first layer material includes an inorganic oxide, and the etchant includes an acid or a base.

7. The method of claim 1, wherein providing a nanostructured first layer having a plurality of nanopillars defining a plurality of nanowells includes:
forming the nanostructured first layer by depositing a first layer material from a chemical solution having a plurality of templating nanostructures therein; and
selectively removing the plurality of templating nanostructures from the deposited first layer material thereby exposing the plurality of nanopillars defining the plurality of nanowells in the deposited first layer material.

8. The method of claim 1, wherein at least partially filling the plurality of nanowells with a hydrogel includes polymerizing a liquid monomer on a substrate having a plurality of nanopillars thereon.

9. The method of claim 1, wherein selecting a volume of the plurality of nanowells and the hydrogel to cooperatively cause the hydrogel to switch between an anti-reflective state and a reflective state in response to a temperature change includes selecting a hydrogel that includes either a negative temperature sensitive hydrogel that expands below a critical temperature or a positive temperature sensitive hydrogel that contracts below a critical temperature.

10. The method of claim 9, wherein the negative temperature sensitive hydrogel and the positive temperature sensitive hydrogel each exhibit a dehydrated reflective state and a hydrated anti-reflective state.

11. The method of claim 1, wherein the hydrogel includes a positive temperature sensitive hydrogel exhibiting a dehydrated reflective state that occurs at a temperature less than about 20° C. and a hydrated anti-reflective state that occurs at a temperature greater than about 25° C.

12. A method for making a film, the method comprising:
providing a nanostructured first layer having a plurality of nanopillars that define a plurality of nanowells, the nanostructured first layer including a first surface from which the plurality of nanowells inwardly extend;
at least partially filling the plurality of nanowells with a hydrogel; and
selecting a volume of the plurality of nanowells and the hydrogel to cooperatively cause the hydrogel to switch between an anti-reflective state and a reflective state in response to a temperature change;
wherein:
in the anti-reflective state, the hydrogel extends beyond the first surface of the nanostructured first layer to provide a substantially non-planar anti-reflective surface; and
in the reflective state, the plurality of nanowells are substantially filled with the hydrogel to a sufficient level to form a substantially flat reflective surface.

13. The method of claim 12, wherein selecting a volume of the plurality of nanowells and the hydrogel to cooperatively cause the hydrogel to switch between an anti-reflective state and a reflective state in response to a temperature change includes selecting an amount of hydrogel sufficient to impart reflectivity by submersing at least about 90% of a surface area of the nanopillars.

14. The method of claim 12, wherein selecting a volume of the plurality of nanowells and the hydrogel to cooperatively cause the hydrogel to switch between an anti-reflective state and a reflective state in response to a temperature change includes selecting an amount of hydrogel sufficient to impart reflectivity by submersing about 100% of a surface area of the nanopillars.

15. The method of claim 12, wherein the non-planar anti-reflective surface includes raised hydrogel regions defined by the nanowells and depressed regions defined by the nanopillars.

16. The method of claim 12, wherein selecting a volume of the plurality of nanowells and the hydrogel to cooperatively cause the hydrogel to switch between an anti-reflective state and a reflective state in response to a temperature change includes selecting an amount of hydrogel sufficient to exhibit a hydrogel height above the nanopillars of at least about 10 nm while in the anti-reflective state.

17. The method of claim 12, wherein selecting a volume of the plurality of nanowells and the hydrogel to cooperatively cause the hydrogel to switch between an anti-reflective state and a reflective state in response to a temperature change includes selecting a hydrogel that comprises either a negative temperature sensitive hydrogel that expands below a critical temperature or a positive temperature sensitive hydrogel that contracts below a critical temperature.

18. The method of claim 12, wherein the hydrogel includes a positive temperature sensitive hydrogel exhibiting a dehydrated reflective state that occurs at a temperature less than about 15° C. and a hydrated anti-reflective state that occurs at a temperature greater than about 30° C.; or a positive temperature sensitive hydrogel exhibiting a dehydrated reflective state that occurs at a temperature less than about 20° C. and a hydrated anti-reflective state that occurs at a temperature greater than about 25° C.

19. A method for making a film, the method comprising:
   forming a nanostructured first layer having a plurality of nanopillars defining a plurality of nanowells, the nanostructured first layer including a first surface from which the plurality of nanowells inwardly extend;
   at least partially filling the plurality of nanowells with a hydrogel; and
   selecting a volume of the plurality of nanowells and the hydrogel to cooperatively cause the hydrogel to switch between an anti-reflective state and a reflective state in response to a temperature change;
   wherein:
      in the anti-reflective state, the hydrogel is in a substantially fully hydrated state and extends beyond the first surface of the nanostructured first layer to form a substantially anti-reflective surface defined by the nanostructured first layer and the hydrogel, and further wherein the anti-reflective surface includes a non-planar surface comprised of raised hydrogel regions defined by the nanowells and depressed regions defined by the nanopillars; and
      in the reflective state, the hydrogel is in a substantially fully dehydrated state that is substantially level with the first surface to form a substantially flat reflective surface.

20. The method of claim 19, wherein:
in the reflective state, the hydrogel is in the substantially fully dehydrated state at a first temperature, and
in the anti-reflective state, the hydrogel is in the substantially fully hydrated state at a second temperature,
wherein the first temperature is greater than about 30° C., and the second temperature is less than about 15° C.

21. A method for making a film, the method comprising:
providing a nanostructured first layer having a plurality of nanopillars defining a plurality of nanowells;
at least partially filling the plurality of nanowells with a hydrogel; and
selecting a volume of the plurality of nanowells and the hydrogel to cooperatively cause the hydrogel to switch between an anti-reflective state and a reflective state in response to a temperature change;
wherein:
   in the anti-reflective state, the hydrogel and the plurality of nanopillars cooperatively provide a substantially non-planar anti-reflective surface; and
   in the reflective state, the plurality of nanowells are substantially filled with the hydrogel to a sufficient level to form a substantially flat reflective surface.

* * * * *